UNITED STATES PATENT OFFICE.

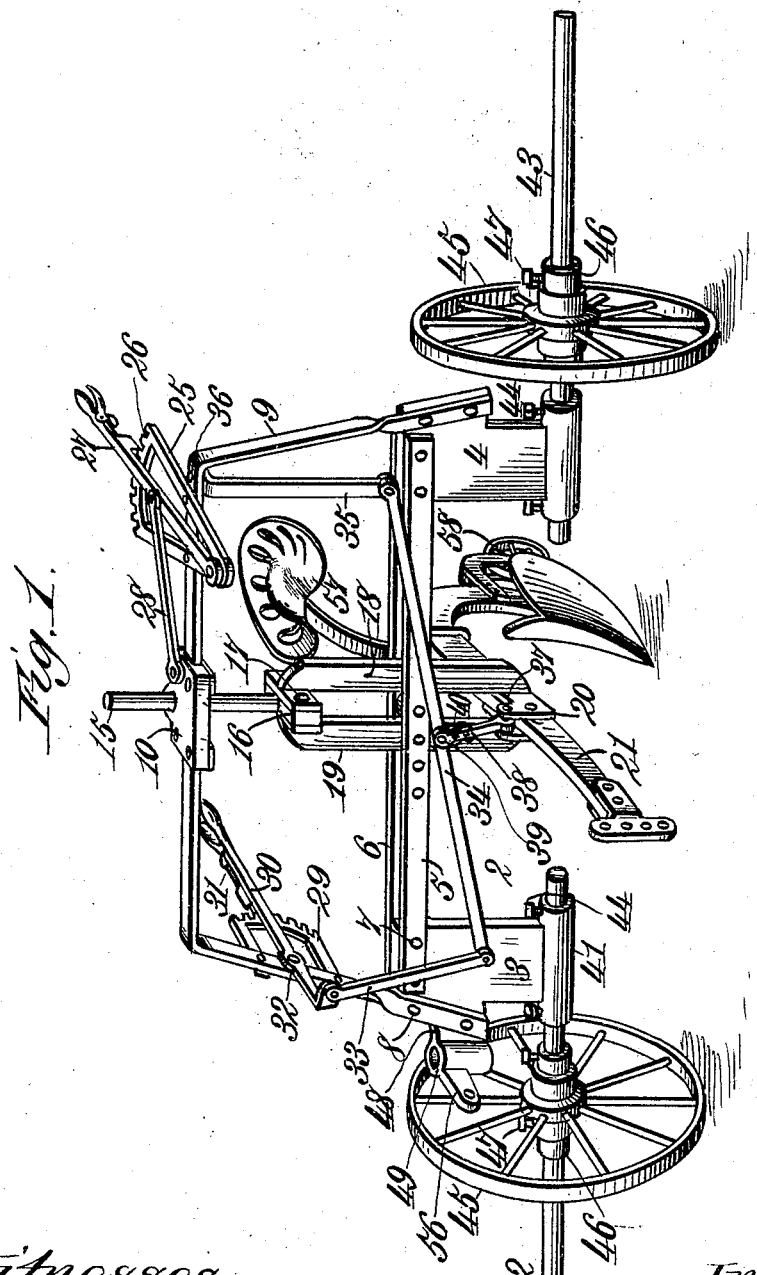

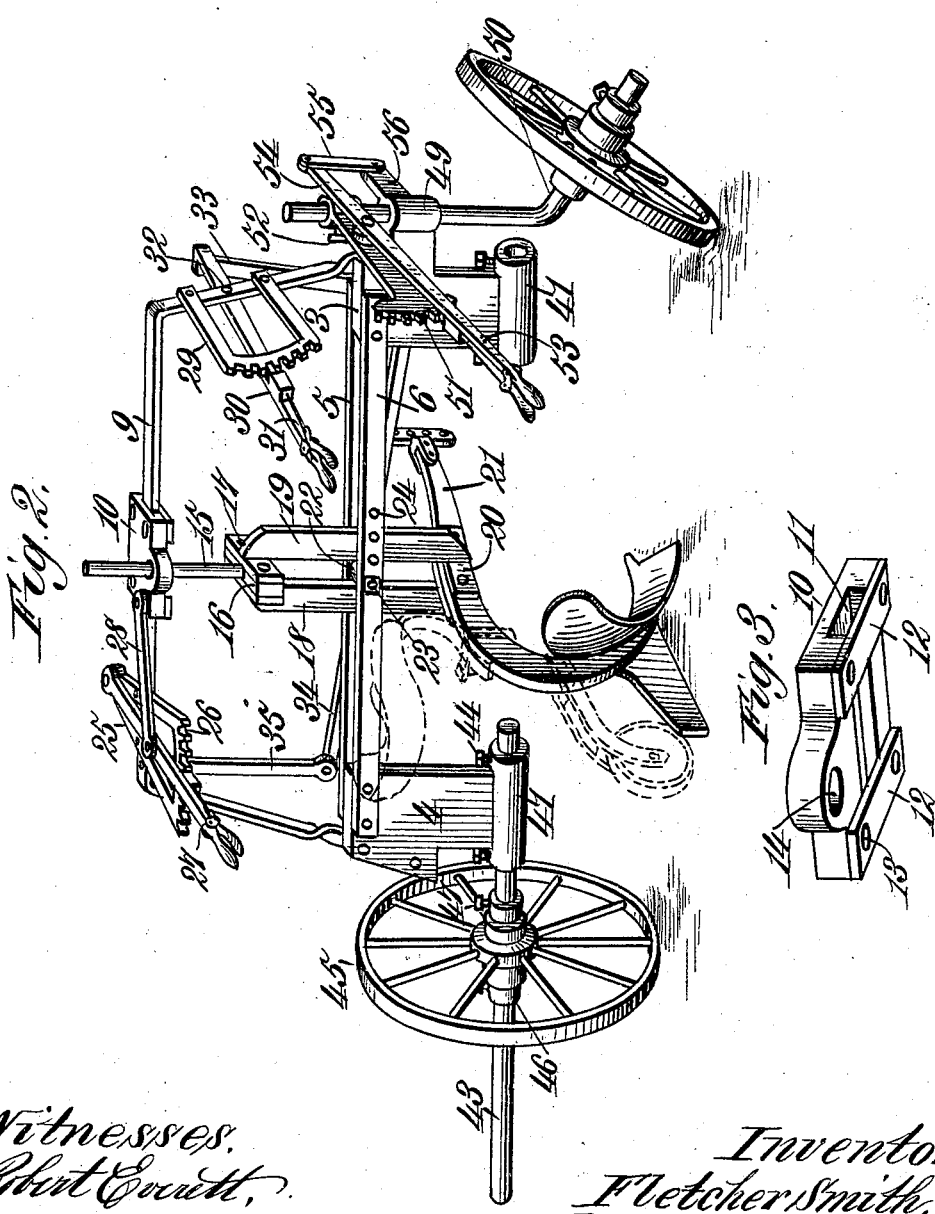

FLETCHER SMITH, OF MERTENS, TEXAS, ASSIGNOR OF ONE-HALF TO JOE VANE SMITH, OF MERTENS, TEXAS.

PLOW ATTACHMENT.

No. 820,147.      Specification of Letters Patent.      Patented May 8, 1906.

Application filed April 29, 1905. Serial No. 258,024.

*To all whom it may concern:*

Be it known that I, FLETCHER SMITH, a citizen of the United States, residing at Mertens, in the county of Hill and State of Texas, have invented new and useful Improvements in Plow Attachments, of which the following is a specification.

This invention relates to plow attachments, and particularly to that class adapted for converting walking-plows into riding or sulky plows.

One of the objects of the invention is the provision of means for the attachment of walking-plows, planters, and other cultivating implements to a carriage.

Another object of the invention is the provision of means for various adjustments of the plow when connected to the carriage.

With these and other objects in view my invention consists in the construction, combination, and arrangement of parts, as hereinafter described, and the preferred embodiment of the invention illustrated in the accompanying drawings. However, I desire it to be understood that I may make such changes, variations, and modifications as come properly within the scope of the claims hereunto appended.

In the drawings, Figure 1 is a view in perspective looking toward the rear. Fig. 2 is a similar view looking toward the front with one of the axles and wheels removed and a cripple-wheel attachment substituted therefor. Fig. 3 is a detail view, on an enlarged scale, of the sliding block.

Reference being had to the accompanying drawings, wherein like characters of reference indicate corresponding parts throughout the several views, the numeral 2 indicates the frame of the carriage, which includes sections 3 and 4 vertically arranged and held separated a distance from one another by parallel bars 5 and 6, connected by bolts 7 at opposite sides thereof. Above the sections 3 and 4 and connected thereto by fastenings 8 is an inverted-U-shaped frame 9, having a slidable block 10 mounted thereon, the latter provided with a groove 11, corresponding to the shape of the said U-shaped frame 9 and held in position thereon by tie-plates 12, secured to the block 10 with bolt-fastenings 13. Said block 10 is provided with an opening 14 to receive a rod 15, the latter having its lower end connected to a block 16, which is secured by fastenings 17 to a coupling device composed of spaced sections 18 and 19, the same extending downwardly between the parallel bars 5 and 6 and the ends thereof detachably connected by plates 20 to the beam of a plow 21 of the ordinary walking type. Interposed between the sections 18 and 19 is a frictional wheel 22, mounted on a detachable pin 23, the latter mounted in openings 24 in the parallel bars 5 and 6, so as to allow lateral shifting of the said sections 18 and 19 and to form a guide therefor when the same are vertically adjusted.

To one side of the U-shaped frame 9 is a segment 25, having a series of notches 26, which are engaged by a lever 27, pivotally connected to said segment 25. Said lever 27 is connected by a link 28 to the slidable block 10, so as to move the same on the U-shaped frame 9 to cause the shifting of the sections 18 and 19 on the frictional wheel 22 and to move the beam of the plow 21 in a lateral direction when desired. At the opposite side of the U-shaped frame 9 is a toothed segment 29, the latter being engaged by a lever 30, having a catch device 31, adapted to lock the same in an adjusted position on the said segment. Said lever 30 is pivoted at 32 to said frame 9, and the lower end is connected to a plurality of pivotally-connected levers 33, 34, and 35, the latter pivoted at 36 to said frame 9.

Secured between the plates 20 by a pin 37 is a link member 38, which is connected to the lever 34 by a pin 39, passing through openings 40 in said link member 38, and to raise or lower the beam of the plow 21 it is necessary to release the catch 31 on the lever 30 from the tooth-segment 29 and by moving the same, which will impart motion to said pivotal levers 33, 34, and 35, and through the medium thereof and the link connection 38 causes the said beam of the plow 21 to be either raised or lowered to any desired position.

Each of said sections 3 and 4 is provided with sockets 41 for receiving detachable axles 42 and 43, which are secured thereon by set-screws 44, and on said axles 42 and 43 are wheels 45. The latter are capable of being adjusted on said axles 42 and 43 and are held in position thereon by collars 46, provided with set-screws 47. Said section 3 is provided with an extension 48 at one side thereof, the same having a socket 49 to receive the arm of the cripple-wheel axle 50. (Shown in Fig. 2.)

As a means for adjusting vertically the cripple wheel and axle in Fig. 2, I have shown a tooth-segment 51, mounted on the arm of the said cripple-axle 50 and held thereto by a binding-screw 52. Pivotally connected to the segment 51 is a hand-lever 53, having the usual locking-latch for engaging the said segment and the same extended, as at 54, the latter being connected by a link 55 to the bracket 56 formed on the socket 49.

Mounted on the beam of the plow 21 is a spring-seat 57 of the ordinary form. Also connected to the beam of said plow, at the rear thereof, is a trailer-wheel 58.

Having thus fully described my invention, what I claim as new, and desire to secure by Letters Patent, is—

1. In a plow attachment, an inverted-U-shaped frame having detachable axles, wheels thereon, spaced parallel bars connected to said frame, a vertically and laterally shiftable coupling-section mounted between said bars for detachably connecting the plow, toothed segments carried by said frame, levers connected to the respective segments and to the coupling-section for vertically and laterally moving the same, and catch devices carried by the lever for engaging the segments to lock the coupling-section in an adjusted position.

2. In a plow attachment, an inverted-U-shaped frame having detachable axles, wheels thereon, spaced parallel bars connected to said frame, a vertically and laterally shiftable coupling-section mounted between said bars for detachably connecting the plow, toothed segments carried by said frame, levers connected to the respective segments and to the coupling-section for vertically and laterally moving the same, catch devices carried by the lever for engaging the segments to lock the coupling-section in an adjusted position, and a detachable means for elevating and lowering one of the wheels.

3. In a plow attachment, sections having detachable axles, wheels on the latter, an inverted-U-shaped frame connected to the sections, spaced parallel bars connecting said sections, a shiftable coupling-section in the space between the bars for detachably connecting the plow, a frictional wheel supported by the bars and forming a guide for said shiftable section, means for shifting the latter, and means for raising and lowering the plow-beam.

4. In a plow attachment, sections having detachable axles, wheels thereon, means for vertically adjusting one of said axles, an inverted-U-shaped frame connected to said sections, bars arranged in parallelism for connecting the sections, a coupling-section supported between the bars, a friction-wheel for the coupling-section, a rod carried by the coupling-section, a shiftable block engaging the rod, means connected to the block for actuating the same, and independent means for raising and lowering the beam of the plow.

5. In a plow attachment, an inverted-U-shaped frame having socket-sections for detachably receiving wheeled axles, spaced parallel bars connected to said frame, a coupling device shiftable between said bars, a frictional wheel for the coupling device and adjustably connected to the bars, toothed segments carried by the said frame, levers pivotally connected to the said segments and to the coupling device for actuating the latter, means carried by the levers for engaging the toothed segments to lock the coupling device in an adjusted position, and independent means connected to the frame and one of the axles for adjusting the same.

6. In a plow attachment, an inverted-U-shaped frame having spaced parallel bars, a frictional wheel adjustably mounted between said bars, a shiftable coupling device straddling said frictional wheel and detachably connected to the plow at one end thereof, a shiftable means engaging the other end of said coupling device for moving the same in a lateral direction, and means for raising and lowering said coupling device.

In testimony whereof I have signed my name to this specification in the presence of two subscribing witnesses.

FLETCHER SMITH.

Witnesses:
  R. C. WEST,
  J. S. BRICE.